United States Patent
Lyons et al.

(10) Patent No.: US 11,414,501 B2
(45) Date of Patent: Aug. 16, 2022

(54) METHOD AND APPARATUS FOR DELAYING POLYMERISATION

(71) Applicant: Bausch & Lomb Incorporated, Rochester, NY (US)

(72) Inventors: Sean Lyons, Dublin (IE); Joseph Dowling, Waterford (IE); John Flynn, County Wexford (IE); X. Michael Liu, Glen Allen, VA (US); E. Peter Maziarz, Ashland, VA (US)

(73) Assignee: Bausch & Lomb Incorporated, Rochester, NY (US)

( * ) Notice: Subject to any disclaimer, the term of this patent is extended or adjusted under 35 U.S.C. 154(b) by 1533 days.

(21) Appl. No.: 14/772,106

(22) PCT Filed: Mar. 13, 2014

(86) PCT No.: PCT/US2014/025303
§ 371 (c)(1),
(2) Date: Sep. 2, 2015

(87) PCT Pub. No.: WO2014/151254
PCT Pub. Date: Sep. 25, 2014

(65) Prior Publication Data
US 2016/0017064 A1 Jan. 21, 2016

Related U.S. Application Data

(60) Provisional application No. 61/794,992, filed on Mar. 15, 2013.

(51) Int. Cl.
*C08F 2/40* (2006.01)
*B29B 13/00* (2006.01)

(52) U.S. Cl.
CPC ............... *C08F 2/40* (2013.01); *B29B 13/00* (2013.01); *B29B 2013/005* (2013.01)

(58) Field of Classification Search
CPC ........................................................ C08F 2/40
See application file for complete search history.

(56) References Cited

U.S. PATENT DOCUMENTS

2006/0089474 A1 4/2006 Yamazaki et al.

FOREIGN PATENT DOCUMENTS

| GB | 920 353 A | 3/1963 |
|---|---|---|
| GB | 1 380 832 A | 1/1975 |

(Continued)

OTHER PUBLICATIONS

Louie et al. ("Control of Free-Radical Emulsion Polymerization of Methyl Methacrylate by Oxygen Injection. II. Experimental Study" Journal of Applied Polymer Science, vol. 30, 1985, 3841-3856).*

(Continued)

*Primary Examiner* — Peter F Godenschwager
(74) *Attorney, Agent, or Firm* — Andrew J. Anderson, Esq.; Harter Secrest & Emery LLP

(57) ABSTRACT

The present invention relates to a method of and an apparatus for extending the shelf life of an initiated monomer mixture, the method comprising the prevention of premature free radical polymerisation by introducing oxygen or oxygen-containing gas into a container of the initiated monomer mixture and providing mechanical agitation to the container, wherein said introduction and agitation are performed in a temperature and pressure controlled environment.

14 Claims, 4 Drawing Sheets

(56) References Cited

FOREIGN PATENT DOCUMENTS

| JP | 1974030815 B | 8/1974 |
|---|---|---|
| JP | 2005162834 A | 6/2005 |
| WO | 96/16921 A1 | 6/1996 |
| WO | 00/36052 A1 | 6/2000 |
| WO | 03/070687 A1 | 8/2003 |
| WO | 2006138034 A1 | 12/2006 |

OTHER PUBLICATIONS

Bhanu et al. ("Role of Oxygen in Polymerization Reactions" Chemical Reviews, vol. 91, No. 2, 1991, 99-117).*
Cutié et al.: The Effect of MEHQ on the Polymerization of Acrylic Acid in the Preparation of Superabsorbent Gels (Apr. 25, 1996) © 1997 John Wiley & Sons, Inc. ccc 0021-8995/97/030577-13.
International Search Report in corresponding International Application No. PCT/US2014/025303 completed Jun. 10, 2014 (5 pages).
International Preliminary Report on Patentability in corresponding International Application No. PCT/US2014/025303 completed Feb. 26, 2015 (13 pages).

* cited by examiner

METHOD AND APPARATUS FOR DELAYING POLYMERISATION

PRIORITY CLAIMS TO PRIOR APPLICATIONS

This Application is a § 371 national stage application of International Application No. PCT/US2014/025303 filed Mar. 13, 2014, claiming the benefit of U.S. Provisional Application No. 61/794,992 filed on Mar. 15, 2013, which applications are hereby incorporated herein.

TECHNICAL FIELD

The present invention relates to a method for preserving initiated monomer mixes, in particular to the automated systematic replenishment of oxygen into liquid monomer formulations to control and prolong the shelf life of initiated monomer materials. Further, the invention relates to an apparatus for extending the shelf life on an initiated monomer mixture.

BACKGROUND

Certain polymeric articles or materials, for example contact lenses, are prepared by synthesising monomer mixtures, initiating these and then placing the initiated mixture in a mould cavity and subjecting it to polymerisation conditions. These steps do not always take place straight after each other and thus storage of each of the initial monomer mixture and the initiated mixture is required.

By "initiated" is meant that a radical initiator has been added to the monomer mixture, i.e. an initiator which creates an active centre from which a polymer chain may be generated.

Initiated monomers will cure more quickly when stored outside their optimum storage temperature or when dissolved oxygen present in the monomer mixture has been consumed.

Premature curing (polymerisation) of initiated monomer materials is undesirable as it renders the monomer mix unsuitable for preparing the desired final product, e.g. contact lenses, and can cause clogging of machines used to make such products. In particular, when the monomer mix starts to polymerise prematurely it slowly forms a gel, typically from the bottom of the vessel upwards. Some monomer mixtures, however, auto-accelerate and can react quite violently.

If monomers begin to polymerise in the feed-lines of a contact lens moulding production line, this can be catastrophic and can result in shut-down of the line of a considerable period of time, during which the lines must be cleaned and the production line re-validated.

For most chemical mixtures, keeping the monomer cold (−4° C.) improves stability by reducing the reactivity of the initiator and thus the number of radicals formed. However, some monomer mix components precipitate at temperatures above 4° C. (e.g. 10-12° C.) and therefore such solutions cannot be stabilised by such cooling.

Chemical inhibition of polymerisation, for example with butylhydroxytoluene (BHT) or 4-methoxyphenol (MEHQ), has also been used to avoid premature curing. However, use of chemical inhibitors is effectively the addition of another formulation component to the mix. This serves to add further unnecessary formulation variables to the mixing process and adds an opportunity for error.

Additionally, if the raw components in the monomer mix already contain small amounts of BHT, the (ppm) concentrations of BHT in the components would need to be accurately measured and formulated accordingly—this would represent an arduous process. Finally, and perhaps most importantly, during processing (prior to monomer cure, in the oven), it is not possible to remove any residual unreacted inhibitors during this step.

SUMMARY OF THE INVENTION

It is therefore an object of the present invention to provide an improved method for increasing the shelf life of initiated monomer mixes.

According to the invention, there is provided a method of extending the shelf life of an initiated monomer mixture comprising the prevention of premature free radical polymerisation by introducing oxygen or oxygen-containing gas into a container of the initiated monomer mixture and providing mechanical agitation to the container.

In a preferred aspect of the invention, treatment of the initiated monomer mixture, i.e. the agitation and introduction of oxygen or oxygen-containing gas, is performed in a temperature and pressure controlled environment, preferably at a temperature below ambient temperature, particularly preferably at a temperature of about 15° C. (+/−3° C.).

Preferably, the oxygen-containing gas is air. This minimises safety concerns which may exist when storing and/or using pressurised oxygen. Particularly preferably, the air is filtered and dried before being introduced to the container of initiated monomer mixture.

DETAILED DESCRIPTION OF THE PREFERRED EMBODIMENTS

In one embodiment, the method is carried out manually by exposing the initiated monomer mixture to atmospheric air by opening the container and subsequently closing the container and agitating it, e.g. by manual shaking. This method may be referred to as headspace regeneration.

Alternatively, the method is automated. The automated method is performed in a closed environment, wherein the temperature, the agitation and introduction of oxygen or oxygen-containing gas are controlled and monitored by an electronic controller. This has the added advantage that the container does not need to be opened by a human operator and no monomers and/or initiator are released to the atmosphere on performing the method. Preventing exposure of human workers to aerosols of these materials is always desirable and is particularly desirable if any or all of the components are hazardous to human health.

Another very desirable advantage of the automated method is that the electronic controller enables the operator to set the conditions of pressure, temperature, rate of agitation, duration of agitation and frequency of aeration/agitation cycles. This means that different batches of initiated monomer solutions can be treated in a consistent manner, thereby providing enhanced security against variations between batches resulting in any batch curing before its expected shelf life.

To ensure that this consistency of treatment is meaningful, each batch of initiated monomer is prepared in the exact same volume. Once any given container of initiated monomer is removed from the controlled environment, it is used in its entirety or discarded. Partially used containers are never returned to the controlled environment for later use.

The method, whether manual or automated, is preferably performed in cycles at least once per day. Preferably, a log is kept with the lot number of the mixture and the time and date of headspace regeneration to avoid any cycles being missed.

In the manual method, the initiated monomer mixture is preferably exposed to atmospheric air for 30 seconds (±10 seconds), i.e. in ambient atmosphere. If the monomer container is stored in a controlled temperature environment, it must be removed from the storage unit in order to perform the manual method.

The inventors have surprisingly found that introduction of oxygen, for example as air, to an initiated monomer mixture and agitating the mixture greatly improves the stability of the monomer mixture against curing resulting in extended shelf life prior to placing the mixture in a mould cavity and subjecting it to polymerisation conditions. Without being bound by theory, it is suggested that this improved stability is due to the oxygen introduced into the initiated monomer mixture temporarily acting as a polymerisation inhibitor due to radicals resulting from initiation of the monomer mixture reacting with molecular oxygen to form less reactive oxygen radicals, essentially terminating the chain. It is understood that various initiated monomer mixtures will consume dissolved oxygen at differing rates and the oxygenation and agitation conditions can be selected to suit specific monomer mixtures.

The methods described herein extend the shelf life of initiated monomer mix up to 7 days post initiation. A preferred monomer mix utilised in the applicants Biotrue ONEday lens and described in U.S. Pat. Nos. 8,197,841 and 8,138,290 (to Bausch & Lomb), the contents of each of these two patents being incorporated by reference herein, has a shelf life of approximately two days when no re-oxygenation process is utilised.

Preferably, the volume of the container is at least 20% larger than the volume of initiated monomer mixture contained therein, particularly preferably from 20% to 100% larger, e.g. 50%. This provides headspace, i.e. space in the container above the initiated monomer mixture, for the introduced oxygen or oxygen-containing gas and/or for exhaust gas resulting from reaction of oxygen with the mixture.

In one embodiment, the oxygen or oxygen-containing gas is fed into the headspace of the container above the initiated monomer mixture contained therein, i.e. oxygen is introduced above the meniscus of the liquid mixture. Alternatively and preferably, the oxygen or oxygen-containing gas is sparged into the initiated monomer mixture.

By "sparging" is meant bubbling gas through the monomer mixture, i.e. oxygen is introduced below the meniscus of the liquid mixture. By "aeration" is meant sparging with air.

In a preferred embodiment, introduction of oxygen or oxygen-containing gas to the mixture takes place for a predetermined duration. The preferred duration is in the range of from approximately 5 seconds to approximately 5 minutes, preferably from approximately 10 seconds to approximately 3 minutes, e.g. 30 seconds. For the manual method the preferred duration of agitation is in the range of from approximately 28 seconds to approximately 32 seconds. In the automated method it is preferably 60 seconds.

The preferred sparging rate is in the range of from approximately 0 to approximately $5.0\text{E}{-}05$ m$^3$/sec (e.g. approximately 0 to approximately 3 slpm (standard litres per minute)), e.g. approximately $3.33\text{E}{-}05$ m$^3$/sec (approximately 2 slpm).

In a particularly preferred method, every 2.5 hours the system agitates a shelf for 10 minutes at 130 RPM (2.167 Hz). During the first 30 seconds of this 10-minute mix cycle the air is sparged in at 2 slpm (that is 2 standard litres per minute, a standard litre is a litre that has been corrected to represent standard temperature and pressure, it corresponds to approximately $3.33\text{E}{-}05$ m$^3$/sec of a volume flow rate), i.e. sparging and agitation occur partially simultaneously.

$3.33\text{E}{-}05$ m$^3$/sec of a volume flow rate amounts to 0.33 litres of air per 2 litres of monomer during a mixing cycle. If we assume approximately 21% of air is Oxygen that equates to 0.0693 litres of Oxygen per 2 litres of monomer per mixing cycle. The shelves are offset from each other by 50 minutes to prevent all of the shelves mixing at once and putting too great of a vibrational load on the fridge skeleton.

Sparging and mechanical agitation may occur in separate, subsequent steps or simultaneously. Preferably, introduction of oxygen or oxygen-containing gas to the contents of the container occurs simultaneously with the agitation of the container. Particularly preferably, the duration of introduction of oxygen or oxygen-containing gas to the mixture is a function of the duration of agitation, e.g. between 0 and ⅓ of the duration of agitation. Thus in a preferred embodiment, introduction of oxygen or oxygen-containing gas to the contents of the container occurs at least partially simultaneously with the agitation of the container.

Agitation mixes the introduced oxygen with the initiated monomer mixture and includes shaking, rotating and the like. Precise rate and duration of agitation ensures a homogeneous mixture of oxygen and initiated monomer is obtained.

In a preferred embodiment, mechanical agitation of the container takes place at a predetermined rate and/or for a predetermined duration.

The preferred rate of agitation is in the range of from approximately 0.10 Hz to approximately 4 Hz, preferably approximately 2 Hz to approximately 4 Hz, e.g. 2.167 Hz (130 rpm).

The preferred duration of agitation is in the range of from approximately 5 seconds to approximately 15 minutes, preferably from approximately 3 minutes to approximately 12 minutes, e.g. 10 minutes. For the manual method the preferred duration of agitation is in the range of from approximately 8 seconds to approximately 12 seconds. In the automated method it is preferably 10 minutes.

The automated method of the invention can be used to simultaneously treat a plurality of containers of initiated monomer mixtures. Preferably, 2 to 24 containers are treated simultaneously, particularly preferably 12 to 18. For example, four containers may be simultaneously sparged with air and agitated for a predetermined time.

The containers are preferably treated in batches, wherein the treatment is cycled and monitored by an electronic controller. For example, 18 containers may be treated in batches of 6, i.e. three cycles of treatment are performed.

In the automated method, the cycle is preferably automatically initiated based on input from the operator.

In a preferred embodiment of the invention a cycle takes place every 1 to 5 hours, preferably every 2 to 3 hours, e.g. every 2.5 hours.

The preferred cycle is as follows: The first step is a check that the environment is at the correct temperature. Then access ports are checked to see if they are closed and secure. Incoming oxygen or oxygen-containing gas (typically air) is then optionally filtered and dried to ensure quality and the pressure thereof is optionally reduced to control the pressure experienced by each container. At the same time the agitation cycle takes place. Here checks for motor errors are made, the mixing speed is set and each container is mixed for a time determined by the apparatus timer based on the operator input. After the containers have been provided with oxygen, e.g. aerated, and agitated for a predetermined time, the cycle begins again after a predetermined amount of time has elapsed.

Advantageously, a shelf is agitated for 10 minutes at 130 RPM (2.167 Hz) every 2.5 hours. During the first 30 seconds of this 10-minute mix cycle the air is sparged in at 2 slpm (that is 2 standard litres per minute, a standard litre is a litre that has been corrected to represent standard temperature and pressure, it corresponds to approximately 3.33E−05 $m^3$/sec of a volume flow rate). The shelves are preferably offset from each other by 50 minutes to prevent all of the shelves mixing at once and putting too great of a vibrational load on the fridge skeleton.

Preferably, oxygen is introduced to a container in metered amounts, whether it is introduced as pure oxygen, air or other oxygen-containing gas. Precise metering of added oxygen ensures each container receives an equivalent amount of oxygen depending on the volume of initiated monomer.

In addition to extending the shelf life of an initiated monomer mix, the automated method has one or more of the following advantages over the manual method:

All of the steps are automated and remove the need for operator intervention;

The addition of oxygen is metered precisely compared with simply leaving the monomer container open to atmosphere;

Each container of initiated monomer receives exactly the same amount of oxygen on a volume/volume basis and, if air is used, this can be adequately filtered and dried prior to introduction to the monomer;

The automated system delivers the oxygen in a temperature controlled and monitored environment;

Mixing of the monomer is controlled at a precise rate and duration to ensure a homogeneous mixture is obtained;

Time between mixing cycles is optimised and cycles occur automatically; and

Only users with sufficient access privileges can alter the mixing process.

A further advantage of the automated system in that it enables several containers of initiated monomer to be treated in a consistent fashion without any compromise of the desired identity of treatment of each batch. For example, a refrigerated unit may be configured with three shelves, each containing shaking locations for four separate monomer containers. Each shelf can be treated by the system independently of each other shelf and can be set to undergo the aeration/agitation cycle independently of the other shelves.

The system can also be configured to provide a display which indicates to an operator which initiated monomer container has been in the unit for the longest time and therefore, the next to be used for making product.

Furthermore, the system can be configured to detect when the unit door is opened and closed and to compensate for any interruption in the cycles of all batches on all shelves caused by the opening. This is desirable since to elongate the useful working life of the refrigeration unit, different shelves will be set to agitate at different times relative to one another.

The system is also advantageously configured to interrupt an aeration or agitation cycle if the door is opened, to detect the duration of the interruption for all batches, and to restart the cycles as if no interruption has occurred.

The initiated monomer mixtures whose stability is improved by the methods described herein are those which can be readily cured to desired shapes by conventional methods such as UV polymerisation, or thermal polymerisation, or combinations thereof, as commonly used in polymerising ethylenically unsaturated compounds.

The invention is thus applicable to a wide variety of initiated monomer mixtures, especially those listed in U.S. Pat. No. 8,197,841 and U.S. Pat. No. 8,138,290 (to Bausch & Lomb). The uninitiated monomeric mixture preferably comprises: (a) a major amount of a non-silicone-containing hydrophilic monomer; (b) a hydrophobic monomer; and (c) a crosslinking agent. Alternatively, the uninitiated monomeric mixture comprises one or at least two of the comonomers and oligomers and functionalised surfactants, i.e. chemically modified poloxamer and poloxamine block copolymers are provided in U.S. Pat. No. 8,197,841, and, when occasions demand, one or more crosslinking agents. However, the shelf life of any initiated monomer mixture which undergoes free radical polymerisation and is suitable for the preparation of contact lenses may be extended using the method according to the invention.

For example, monomer mixtures for hydrogels may be treated by the method of the invention.

The monomer mixture may contain one or more of the silicon compounds, e.g. siloxanyl(meth)acrylate, siloxanyl (meth)acrylamide and silicone oligomers.

Suitable non-silicone-containing hydrophilic monomers include amides such as N,N-dimethylacrylamide, N,N-dimethylmethacrylamide and the like, cyclic lactams such as N-vinyl-2-pyrrolidone and the like, poly(alkene glycols) functionalised with polymerisable groups and the like. Examples of useful functionalised poly(alkene glycols) include poly(diethylene glycols) of varying chain length containing monomethacrylate or dimethacrylate end caps. In a preferred embodiment, the poly(alkene glycol)polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing non-silicone-containing hydrophilic monomers can also be used in the monomeric mixtures herein.

Suitable hydrophobic monomers (b) include ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl(meth)acrylates-containing hydrophobic monomers, N-fluoroalkyl(meth)acrylamides-containing hydrophobic monomers, N-fluoroalkyl vinylcarbonates-containing hydrophobic monomers, N-fluoroalkyl vinylcarbamates-containing hydrophobic monomers, silicone-containing (meth)acrylates-containing hydrophobic monomers, (meth) acrylamides-containing hydrophobic monomers, vinyl carbonates-containing hydrophobic monomers, vinyl carbamates-containing hydrophobic monomers, styrenic-containing hydrophobic monomers, polyoxypropylene(meth)acrylate-containing hydrophobic monomers and the like and mixtures thereof. As used herein, the term "(meth)" denotes an optional methyl substituent. Thus, terms such as "(meth) acrylate" denotes either methacrylate or acrylate, and "(meth)acrylamide" denotes either methacrylamide or acrylamide.

The hydrophobic monomer will ordinarily be present in the monomeric mixture in an amount ranging from about 0.5 to about 25 and preferably from about 1 to about 10 weight percent, based on the total weight of the monomeric mixture.

Suitable crosslinking agents are known in the art.

The monomeric mixture may further contain various additives such as an antioxidant, colouring agent, ultraviolet absorber, lubricant, internal wetting agents, toughening agents and the like and other constituents as is well known in the art.

Uninitiated monomer mix can usually be initiated up to 21 days after preparation. The monomeric mixture is initiated by adding a radical initiator. Suitable initiators will be known to those skilled in the art. Representative free radical thermal polymerisation initiators are selected from among 2'-azobis(2,4-dimethylvaleronitrile), dilauroyl peroxide, bis (4-t-butylcyclohexyl)peroxydicarbonate, tert-amyl peroxybenzoate, 4,4-Azobis(4-cyanovaleric acid), benzoyl peroxide, 2,2-bis(tert-butylperoxy)butane, 1,1-bis(tert-butylperoxy)cyclohexane, tert-butyl hydroperoxide, dicumyl peroxide, cyclohexanone peroxide, cumene hydroperoxide, tert-butylperoxy isopropyl carbonate, tert-butyl peroxybenzoate, tert-butyl peracetate. This list is, however, by no means exhaustive. A particularly preferred initiator is AIBN.

The initiator, e.g. AIBN, is typically added to the uninitiated monomer mix in a dry air environment when initiation is required.

Generally, the initiator will be employed in the monomeric mixture at a concentration at about 0.1 to about 5 percent by weight of the total mixture. The amount of initiator is typically calculated using the following equation: Monomer net weight in grams×0.00418=Grams of Initiator Required. The amount of initiator added should ideally be weighed using a tolerance of ±0.20%.

In a particularly preferred embodiment, the monomer mixture to be treated by the methods as described herein comprises N-vinyl pyrrolidone, t-butyl-hydroxycyclohexyl methacrylate, 1,2-propanediol, 2-hydroxyethyl methacrylate, ethylene glycol dimethacrylate, allyl methacrylate, 2-[3-(2H-benzotriazol-2-yl)-4-hydroxyphenyl]ethyl methacrylate and poloxomer 407 dimethacrylate. Monomer mixes further comprising In-Monomer Visibility Tint (RD-322) may also be treated.

In a further aspect, the invention provides an apparatus for extending the shelf life of an initiated monomer mixture, the apparatus comprising:
refrigeration means;
means for introducing oxygen or oxygen-containing gas into a container of initiated monomer mixture, preferably wherein said introduction is by sparging into the mixture;
means for evacuating exhaust gas generated by reaction of oxygen with the mixture;
means for mechanical agitation of the container; and
an electrical controller for controlling the refrigeration temperature, the agitation and the introduction of oxygen or oxygen-containing gas.

The electrical controller is adapted to monitor at what time a container has been removed from or placed into the apparatus and to indicate to the operator which container is to be removed next, i.e. which initiated monomer mixture is closest to the maximum shelf life and thus to be used next.

In one embodiment of this aspect of the invention, the means for introducing oxygen or oxygen-containing gas into a container comprises pressurised air inlet and outlet lines. In a particularly preferred embodiment these lines are connected to the cap of the container.

The apparatus preferably has a front access door. A user interface screen and operator control buttons are preferably located above the door.

In yet a further aspect, the invention provides a system for extending the shelf life of an initiated monomer mixture, the system comprising:
one or more containers of initiated monomer mixture;
one or more shelves for the containers;
refrigeration means;
means for introducing oxygen or oxygen-containing gas into the container;
means for evacuating exhaust gas generated by reaction of oxygen with the mixture;
means for mechanical agitation of the container, the means attached to a shelf; and
an electrical controller for controlling the temperature of the system, the agitation and the introduction of oxygen or oxygen-containing gas;
a user interface screen which displays process information relating to the system; and
operator control buttons for controlling one or more of: the temperature, the agitation and the introduction of oxygen or oxygen-containing gas.

The status of various process indicators can be checked from the user interface screen. One or more of temperature, agitation duration, agitation rate, oxygen or oxygen-containing gas flow rate and/or pressure may be checked. Preferably each of these process indicators can be checked from the user interface screen.

All apparatus and system functions are preferably operated from the user interface screen. For example, by means of tapping the relevant touch screen buttons on the user interface screen, the value between set time and/or rate limits can be altered.

The introducing means of the apparatus or systems described herein preferably comprises one or more of, particularly preferably all of, an air service unit, an air dryer with pre-filter (e.g. 0.01 µm), a flow controller, a pressure regulator and valves/distribution manifolds.

If the apparatus or system comprises an air dryer with pre-filter, the electrical controller is preferably adapted to monitor the length of time the dryer has been in use and to display this information on the user interface screen.

The user interface screen is capable of allowing for users with sufficient access to change one or more critical parameters for adding air to the monomer mixtures.

A preferred system has a plurality of containers spaced over one or more shelves. Each container is preferably located in its own gripping nest which is mounted on an agitating platform on the shelf. Shelf agitation induces a movement of the initiated monomer mixture inside the container at a rate which is preferably variable from the operator user interface screen.

Drive motors for shelf agitation are preferably located underneath each shelf within a housing.

A door switch is preferably provided on the front access door to detect the status of the door (open or closed). In addition, this door is preferably locked while agitation is taking place to prevent accidental opening.

In yet a further aspect, the invention provides an electronic controller for an agitation and oxygenating or aerating refrigeration apparatus comprising:
means for receiving and displaying process information relating to the rate and duration of introducing oxygen or oxygen-containing gas into a container and the rate and duration of agitation of the container;
means for displaying and setting the temperature of the apparatus; and
means for displaying and setting on and off time periods for the apparatus.

The invention will be more clearly understood from the following description of some embodiments thereof, given by way of example only, with reference to the accompanying drawings, in which:

DETAILED DESCRIPTION WITH REFERENCE TO THE DRAWING FIGURES

Figure 1B:
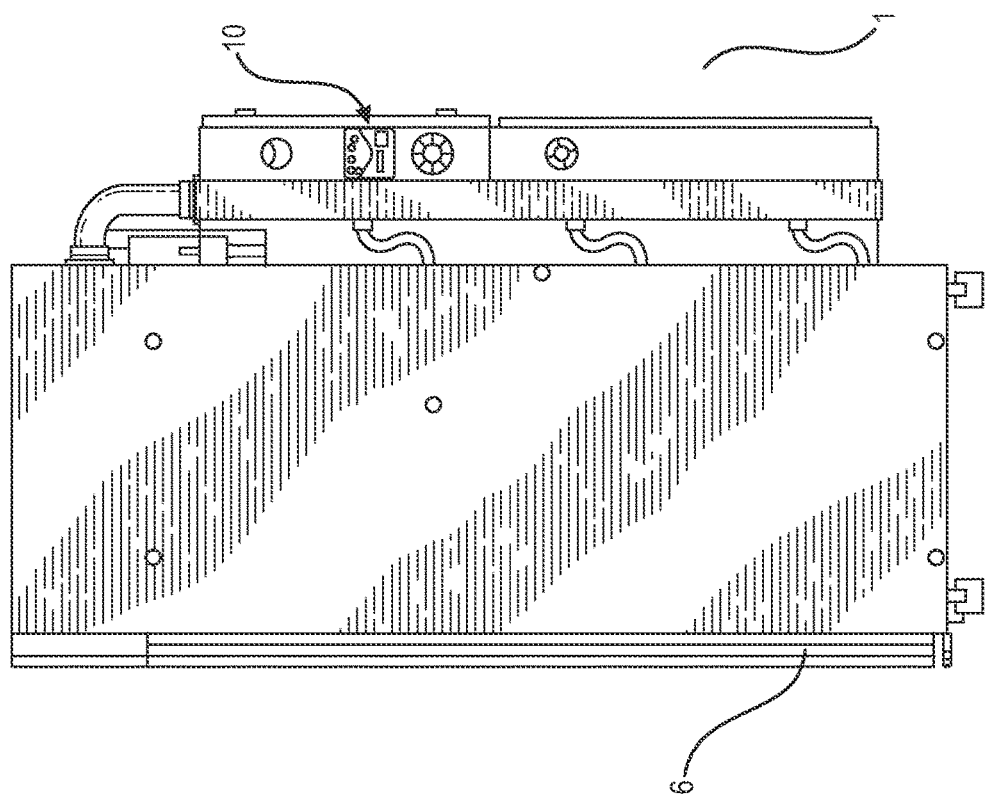
FIGS. 1a and 1b respectively show front and side views of a preferred apparatus for performing the method according to the invention loaded with containers.

Referring to the drawings, there is shown an apparatus for automated sparging of oxygen or oxygen-containing gas into a container of initiated monomer mixture while providing mechanical agitation to the container.

Figure 1A:
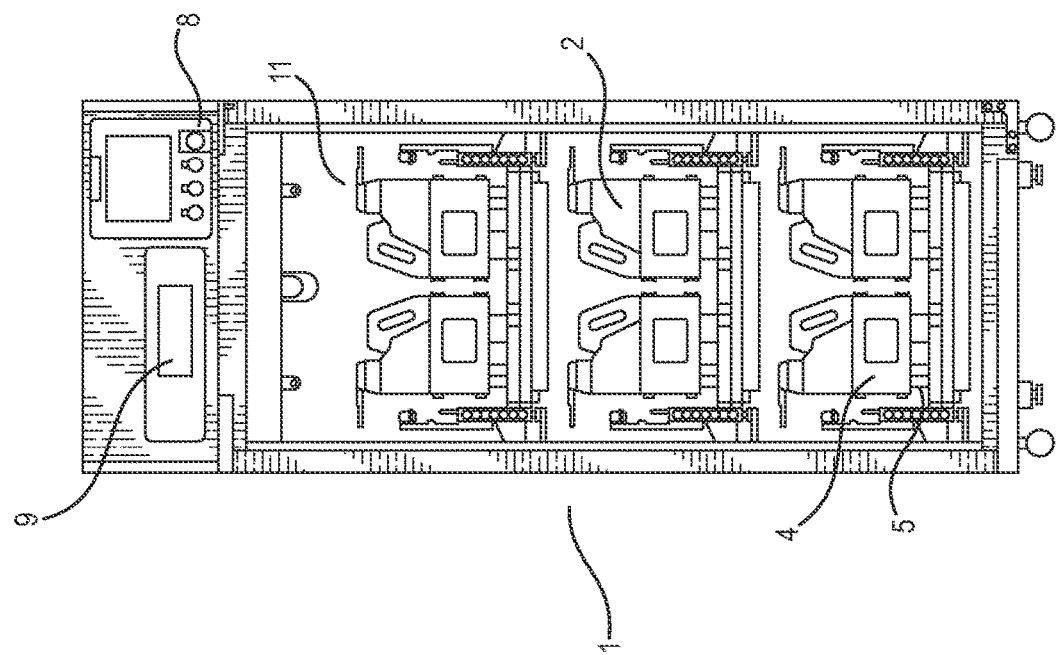
Figure 1C:
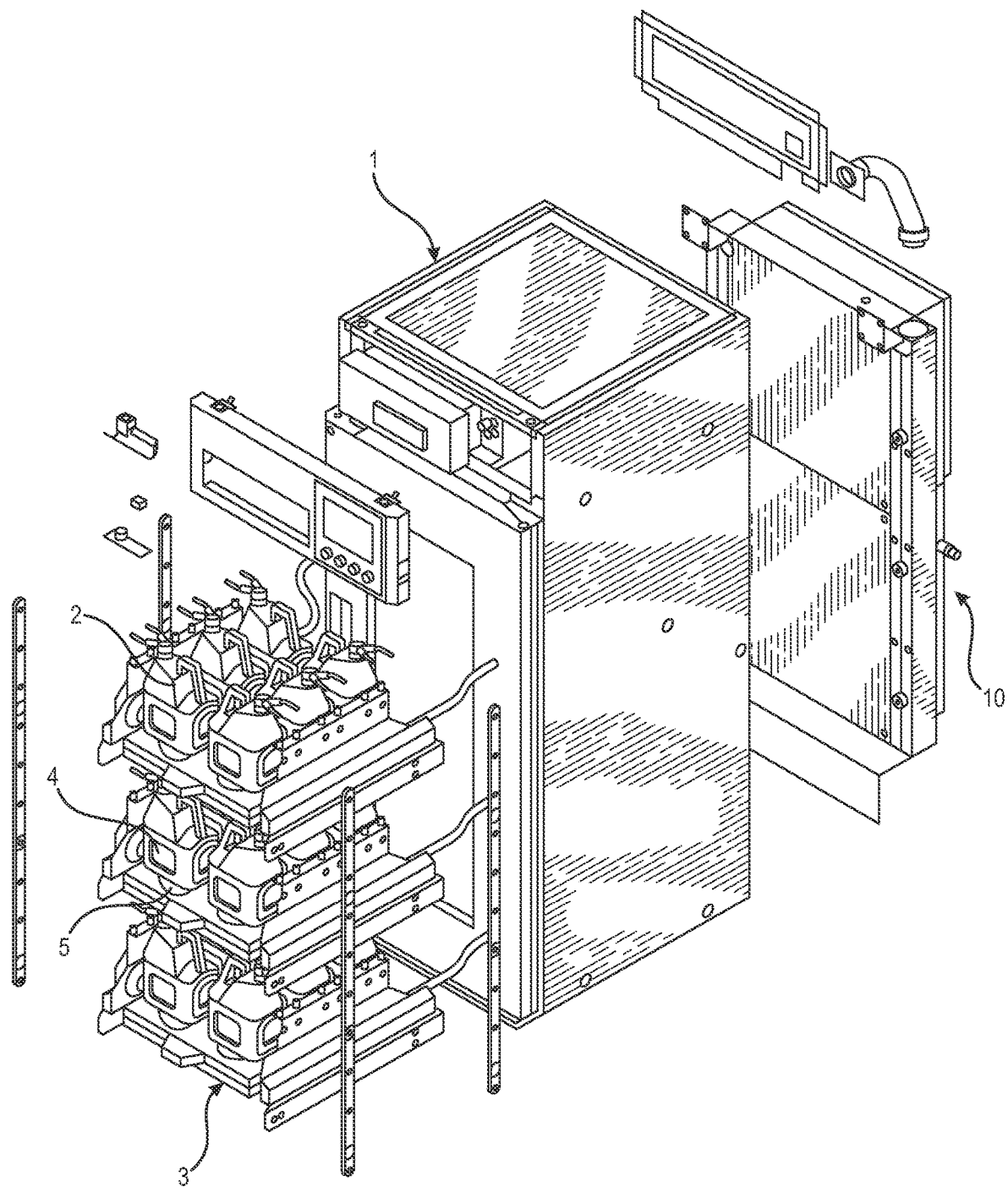
FIG. 1 c shows an exploded view of the apparatus of FIGS. 1a and 1 b.

FIGS. 1a, 1b and 1c show a preferred apparatus 1 for performing the method according to the invention. The preferred apparatus 1 has a plurality of containers 2 spaced over three shelves 3. Each container 2 is located in its own gripping nest 4 which is mounted on a rotating platform 5. Above the front access door 6 of the apparatus there is a user interface screen 7 and operator control buttons 8. The refrigeration control interface 9 is located to the left of the user interface screen 7.

Drive motors for shelf agitation are located underneath each shelf 3 within an aluminium housing. This rotates the rotating platform to induce a sloshing motion in the initiated monomer mixture at a rate which is variable from the operator user interface screen 7 (between approximately 2 and 4 Hz (between about 10 and 200 rpm).

A door switch is provided on the front access door 6 to detect the status of the door 6 (open or closed). In addition, this door 6 is locked by a solenoid bolt while agitation is taking place to prevent accidental opening. In an alternative embodiment, a sensor may be provided to detect when the door is opened and to send a signal which causes rotation of an platform which is in the rotation part of the cycle to cease until the door is closed. All pneumatic components reside in the pneumatic enclosure 10 at the rear of the machine. This panel 10 contains the air service unit, air dryer with pre-filter (0.01 μm), flow controller, pressure regulator and valves/distribution manifolds (not shown).

The air dryer operates on a duty-standby arrangement with desiccant media carrying out the drying function. From the outlet of the air dryer air then enters the precision pressure regulator. This regulator is intended to reduce the pressure experienced by the containers 2 (5-30 psi or approximately 34-207 kPa). The value of this pressure is measured by the flow controller downstream. This flow controller regulates the mass flow delivered to each agitator shelf (0-2 slpm). Finally, air leaving the flow controller is distributed between three manifold blocks, one per shelf 3. Each manifold block is isolated by a 2/2 shutoff valve (normally closed). A final filter (0.5 μm) is placed between the valve and manifold to prevent any possibility of particles shed from the valve entering the air stream. All exhaust (return) air from the containers 2 is piped to the exhaust manifold in the bottom right of the panel 10. This air can then be removed by the exhaust port on the outside of the panel 10.

Once air has been cleaned and prepared in the pneumatic panel 10 it is then piped out to the containers 2 on each agitator shelf 3 via hard wall tubing. Each shelf 3 has twelve pipes routed to it: six pressurised inlet air lines and six exhaust air lines (not shown). These lines are fitted to the cap 11 that is provided for each container 2.

The shaking mechanism used to agitate the containers is designed in such a way as to mitigate most if not all vibration associated with the rotation of an off balance load. All six nests 4 are aligned so as to always have two opposing containers 2 directly counterbalancing each other when their respective centres of gravity are moving. When a particular nest 4 is not in use, the quick connect fittings for that nest 4 should be coupled together to form a direct flow path between the pressure line and the exhaust line.

To start the system, the operator must first ensure the correct running parameters have been entered and press the Start Button on the user interface screen.

Figure 2:
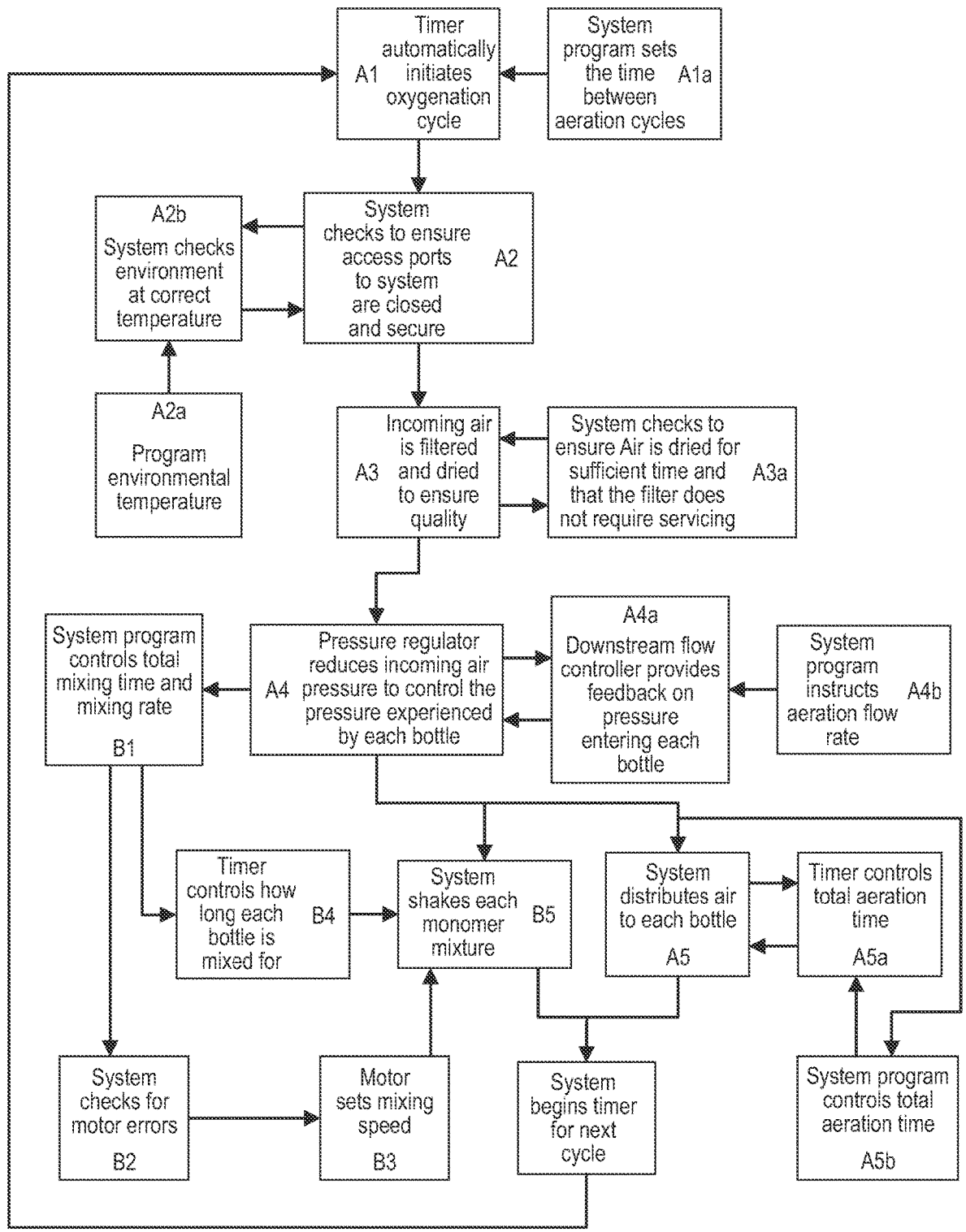
FIG. 2 is a flowchart showing a process for delivering oxygen to contact lens monomer mixtures in accordance with the invention.

FIG. 2 is a flowchart showing the preferred steps of the process cycle according to the method of the invention. In this preferred method, the steps of distributing dried and filtered air and shaking the monomer mixture are performed in cycles at a duration and rate determined by the operator and pre-programmed into the electronic controller.

The oxygenation/aeration cycle A1-A5 is automatically initiated based on the operator input. The first step of this cycle after initiation A1 is a check that the environment is at the correct temperature (A2a and A2b). Then access ports are checked to see if they are closed and secure (A2). Incoming air is then filtered and dried to ensure quality and the pressure thereof is reduced to control the pressure experienced by each container (A3). Data regarding the pressure entering each container is provided to the electronic controller and this data is used to control the aeration flow rate (A4 and A5). At the same time the agitation cycle B1-B5 takes place. Here checks for motor errors are made (B2), the mixing speed is set (B3) and each container is mixed for a time determined by the apparatus timer based on the operator input (B5).

After the containers have been aerated and agitated for the predetermined time, each cycle begins again.

Should any of the checks fail the electronic controller alarms and an operator or technician is summoned. The user interface screen is capable of allowing for users with sufficient access to change critical parameters for adding air to the monomer mixtures.

Figure 3:
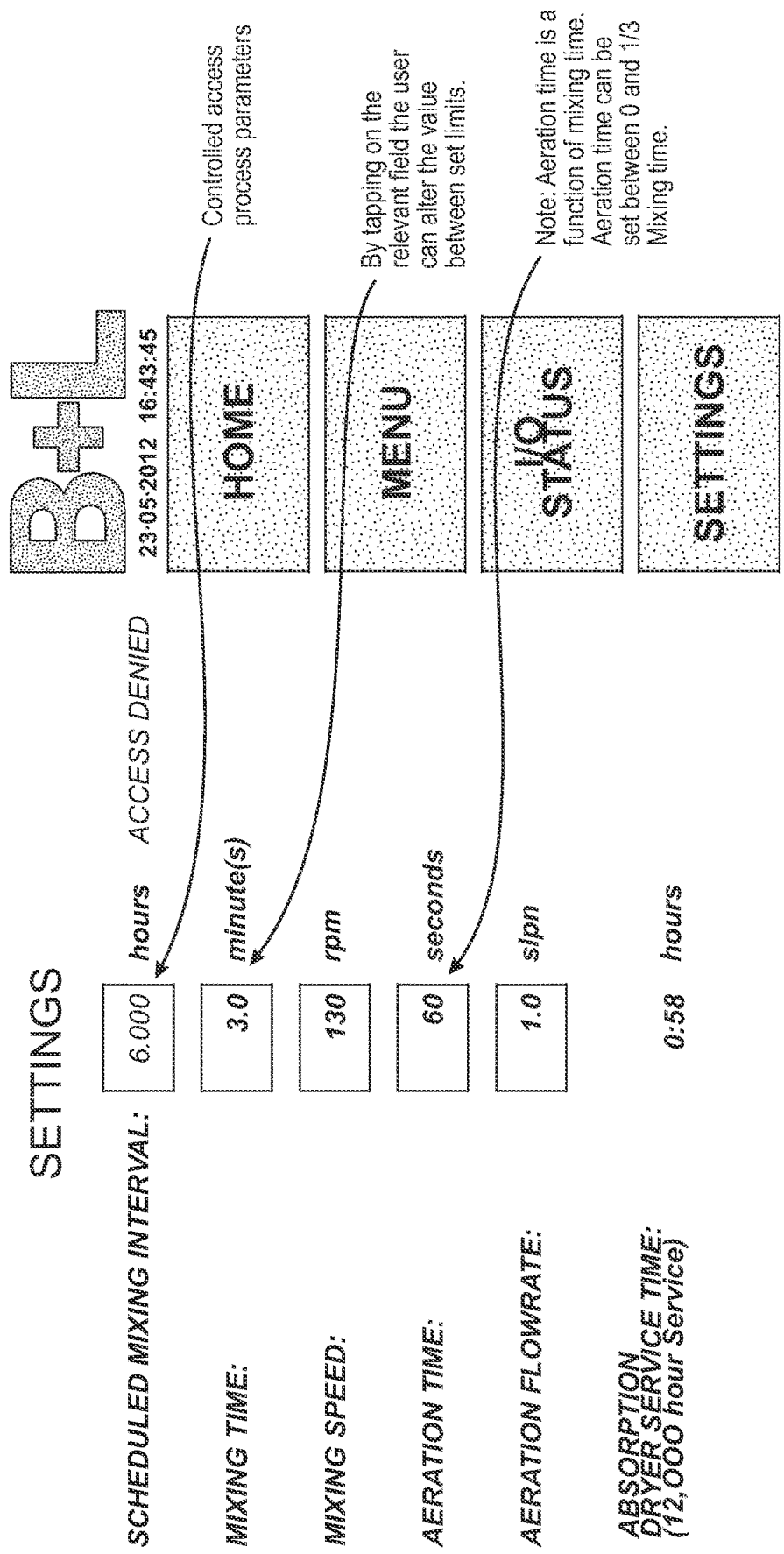
FIG. 3 is an example of an input screen for an apparatus carrying out the method according to the invention.

An example of a user interface screen is shown in FIG. 3. Here the cycle is set to repeat every 6 hours, the duration of agitation (mixing time) is 10 minutes and the rate of agitation ('mixing speed') is 130 rpm (2.167 Hz).

EXAMPLES

Example 1

Preparation of Initiated Monomer Mix

During development of the nesofilcon A monomer formulation (the monomer formulation utilised in production of Biotrue ONEday lenses), it was observed that introduction of oxygen to the formulation greatly improved stability of the monomer mixture resulting in extended shelf life. On average, nesofilcon A monomer mix utilised in the Biotrue ONEday lens has a shelf life of approximately two days when no re-oxygenation process is utilised.

Uninitiated nesofilcon A monomer mix was prepared containing the following ingredients:

| ACTIVE INGREDIENT |
| --- |
| N-vinyl pyrrolidone |
| t-Butyl-hydroxycyclohexyl Methacrylate |
| 1,2-propanediol |
| 2-Hydroxyethyl Methacrylate |
| Ethylene Glycol Dimethacrylate |
| Allyl Methacrylate |
| 2-[3-(2H-Benzotriazol-2-yl)-4-hydroxyphenyl]ethyl methacrylate |
| Poloxomer 407 Dimethacrylate |
| In-Monomer Visibility Tint (RD-322)) |

Formulation requirements were used to calculate the amount of each ingredient required for manufacture of 2 L and 10 L sized batches. Individual ingredients were metered into the formulation using a minimum accuracy of two decimal places.

Initiation of Nesofilcon a Monomer Mix:

| ACTIVE INGREDIENT |
| --- |
| 2,2'-Azobisisobutyronitrile (AIBN) |

The amount of initiator needed was calculated using the following equation:

Monomer net weight in grams×0.00418=Grams of Initiator Required. The amount of initiator added was weighed using a tolerance of ±0.20%.

In a dry air environment the calculated amount of 2,2-azobisisobutyronitrile (AIBN) initiator was added to the mix, the container was sealed, returned to a refrigerator at 15° C. (+/−3° C.), and stirred for 1 hour, (±5 minutes), at 15° C. (+/−3° C.). Approximately 2100 g of monomer was immediately transferred into a 3.0 L HDPE plastic container leaving approximately 1 L of free space to assure adequate headspace to inhibit polymerisation. Transfer into the larger container was carried out in a dry air environment. The mix was stored at 15° C. (+/−3° C.) until use with daily regeneration of the headspace in the HDPE container.

Example 2

Regeneration: Manual Method

A container containing the initiated mix from Example 1 (approximately 2100 g of initiated monomer, container capacity of 3.0 L) was opened for 30 seconds, (±10 seconds), in ambient atmosphere. The container was then sealed the shaken for 10 seconds. A log was kept with the lot number of the mix and the time and date of headspace regeneration.

The initiated mix was stored at 15° C. (+/−3° C.) without premature polymerisation for up to 7 days.

Example 3

Regeneration: Automated Method 18 bottles containing initiated mix from Example 1 (approximately 2100 g L of initiated monomer, container capacity of 3.0 L) were loaded into a Sanyo LabCool refrigerator modified to accommodate three agitation shelves; each shelf consisting of six bottle receptacles aligned so as to always have two opposing bottles directly counterbalancing each another when their respective centres of gravity are moving.

Each bottle was located in its own gripping nest mounted on a rotating platform shaking mechanism.

Every 2.5 hours the system agitated a shelf for 10 minutes at 2.167 Hz (130 rpm). This agitated the bottles to induce a sloshing motion in the monomer mixture.

During the first 30 seconds of this 10-minute mix/agitation cycle, air was sparged in at a volume flow rate of approximately 3.33E−05 $m^3$/sec (or 2 slpm, i.e. 2 standard litres per minute, a standard litre being a litre that has been corrected to represent standard temperature and pressure). This amounts to 0.33 litres of air per 2 litres of monomer during a mixing cycle.

Assuming approximately 21% of air is oxygen, this equated to 0.0693 litres of oxygen per 2 litres of monomer per mixing cycle. The agitation cycles for each shelf were offset from each other by 50 minutes to prevent all of the shelves mixing at once and putting too great of a vibrational load on the fridge skeleton.

Air which has been filtered (40 μm filtration) and dried (water separation) to air to purity class 2.1.1 (as outlined by ISO8573-1) was piped to the refrigeration compartment and into the bottles at an air pressure set to 700 kPa via pressurised inlet air lines. These lines and exhaust air lines were fitted to each bottle cap provided for each bottle. The cap of each bottle allowed free rotation of the stainless steel core while tightening the cap ring.

The initiated mix was stored at 15° C. (+/−3° C.) without premature polymerisation for up to 7 days.

Example 4

Stability Testing 9 batches of the initiated mix from Example 1 were left to cure and the time taken for the mix to start curing was visually assessed.

As seen in Table 1 below, three batches (1, 2 and 3) were treated with the manual method of Example 2. Three batches (4, 5 and 6) were not treated at all and three batches (7, 8 and 9) were treated with the automated method of Example 3. This data is representative of results the inventors have seen during development (i.e. during protocols to investigate different aspects of the manufacturing process). These shelf lives mentioned below were observed again and again.

TABLE 1

| Batch | Shelf Life* | Method used to increase shelf life |
| --- | --- | --- |
| 1 | 4 Days | Manual |
| 2 | 4.5 Days | Manual |
| 3 | 4 Days | Manual |
| 4 | 46 hours | None |
| 5 | 51 hours | None |
| 6 | 53 hours | None |
| 7 | 8 Days | Automated |
| 8 | 7.5 Days | Automated |
| 9 | 8 Days | Automated |

*Time taken for contents of container to begin to gel

Example 5

Stability Testing

A single 10 L batch of initiated mix according to Example 1 was split into ten identical 2 L glass bottles such that each bottle contained an identical volume and weight (1.00 kg) of initiated mix. Each bottle had an identical volume of free space (approximately 1 L). As each 2 L bottle was decanted from the same 10 L batch, all of the raw material components were identical.

Each of the 2 L bottles were stored at 15° C. (+/−3° C.) according to Table 2:

TABLE 2

| Bottle number | Bottle unopened | Manual method [b] | Automated method [c] |
|---|---|---|---|
| 1 | √ | | |
| 2 | √ | | |
| 3 | √ | | |
| 4 | √ | | |
| 5 | | √ | |
| 6 | | √ | |
| 7 | | √ | |
| 8 | | | √ |
| 9 | | | √ |
| 10 | | | √ |

In each case, the conditions were as follows for the duration of study: Bottle unopened: Each 2 L bottle (bottles 1 to 4) was placed in controlled temperature environment and unopened. Manual method: Each 2 L bottle (bottles 5 to 7) was placed in controlled temperature environment, opened to atmosphere once per day for 30 seconds, recapped and shaken vigorously by hand for a minimum of 2 minutes. Automated method: Each 2 L bottle (bottles 8 to 10) was placed in controlled temperature environment and connected to an automated system which initiated a cycle every 150 minutes consisting of agitation for 10 minutes at 2.167 Hz coupled with 30 seconds sparging in of dried air at a volume flow rate of approximately 3.33E−05 m$^3$/sec.

Each bottle was visibly assessed regularly, i.e. a minimum of once every 24 hours, for signs of premature polymerisation characterised by visual increase of monomer viscosity, presence of solid materials in the solution, change in consistency of monomer and colour changes.

Table 3 outlines the times noted for onset of premature curing of each bottle:

TABLE 3

| Bottle number | Time to premature curing |
|---|---|
| 1 | 47 hours |
| 2 | 52 hours |
| 3 | 50 hours |
| 4 | 48 hours |
| 5 | 3.5 days |
| 6 | 4 days |
| 7 | 4 days |
| 8 | >9 days* |
| 9 | >9 days* |
| 10 | >9 days* |

*No premature curing noted after a storage time of 9 days. At 10 days, some curing had begun.

Like Example 4, Example 5 shows that the use of air to regenerate the headspace of a container of initiated monomer mix improves the shelf life and is preferable to sealed storage. Furthermore, the automated method improves the shelf life more than the manual method.

Example 6

A monomer mixture is prepared by mixing the following ingredients: N-vinyl pyrrolidone (90 weight percent), 4-t-butyl-hydroxycyclohexyl methacrylate (10 weight percent), Pluronics® F127 Dimethacrylate (5 weight percent), ethylene glycol dimethacrylate (0.15 weight percent), allyl methacrylate (0.15 weight percent) and 2-hydroxypropyl methacrylate (2 weight percent). 0.5 weight percent of AIBN is added and the mixture is treated with the automated method of Example 3.

The initiated monomer mix does not begin to cure for at least 8 days.

As the monomer started to react, the viscosity of the liquid increased. This occurred slowly (over the course of 2-3 hours) with the mix becoming less 'water like' and more 'honey like'.

As the gelation proceeded, the monomer hardened—typically from the bottom of the container upwards (as this is the monomer that is furthest away from the air present in the container). Once this hardening happened, the cured monomer resembled a solid mass and was no longer mobile. As the reaction reached completion all of the available liquid monomer slowly became solid.

All of the trials were carried out in the same lab, under the same conditions. 2 L of monomer was placed in a 3 L HDPE container (leaving 1 L approximately of air space). The bottles were initiated and stored in the same 15° C. environment and monitored over several days. The batches were said to have gelled when gelation was visually reported by an operator. For the batches that were not treated, the bottles were not opened once initiation had occurred. Without treatment (whether manual or automated), the usable shelf life of this monomer was less than 46 hours. Any longer (and even if no signs of viscosity increase are present) the reaction had already commenced. If monomer which had started to react was added to moulds for lens manufacture, this would lead to severe issues in manufacturing.

With manual or automated treatment the shelf life of the monomer was approximately 7 days. A slight increase in the shelf life was observed when using the automated method over the manual method.

Preferred Embodiments

Disclosed in certain preferred embodiments of the invention herein is:

1. A method of extending the shelf life of an initiated monomer mixture comprising the prevention of premature free radical polymerisation by introducing oxygen or oxygen-containing gas into a container of the initiated monomer mixture and providing mechanical agitation to the container.

2. The method of preferred embodiment 1, wherein said oxygen-containing gas is air.

3. The method of preferred embodiment 2, wherein said air is filtered and/or dried before being introduced into said container.

4. The method of preferred embodiment 1, wherein said method is automated and performed in cycles in a closed environment and wherein the conditions of the environment are controlled and monitored by an electronic controller which enables an operator to set one or more of the pressure, the temperature, the rate of agitation, the duration of agitation, the frequency of the introduction of oxygen or oxygen-containing gas cycles and the frequency of agitation cycles.

5. The method of preferred embodiment 4, wherein the method comprises sparging said oxygen or oxygen-containing gas into the container.

6. The method of preferred embodiment 5, wherein said oxygen-containing gas is air.

7. The method of preferred embodiment 6, wherein said air is filtered and/or dried before being introduced into said container.

8. The method of preferred embodiment 1, wherein said method is carried out at a temperature of about 15° C.

9. The method of preferred embodiment 4, wherein said method is carried out at a temperature of about 15° C.

10. The method of preferred embodiment 1, wherein said introduction of oxygen or oxygen-containing gas and said mechanical agitation occur at least partially simultaneously.

11. The method of preferred embodiment 4, wherein said introduction of oxygen or oxygen-containing gas and said mechanical agitation occur at least partially simultaneously.

12. The method of preferred embodiment 11, wherein said oxygen-containing gas is air.

13. The method of preferred embodiment 12, wherein said air is filtered and/or dried before being introduced into said container.

14. The method of preferred embodiment 1, wherein said introduction of oxygen or oxygen-containing gas and said mechanical agitation are each independently performed at least once every 1 to 24 hours.

15. The method of preferred embodiment 4, wherein said introduction of oxygen or oxygen-containing gas and said mechanical agitation are each independently performed at least once every 1 to 24 hours.

16. The method of preferred embodiment 15, wherein said oxygen-containing gas is air.

17. The method of preferred embodiment 16, wherein said air is filtered and/or dried before being introduced into said container.

18. The method of preferred embodiment 1, wherein mechanical agitation of the container takes place at a predetermined rate and/or for a predetermined duration.

19. The method of preferred embodiment 4, wherein mechanical agitation of the container takes place at a predetermined rate and/or for a predetermined duration.

20. The method of preferred embodiment 19, wherein every 2.5 hours a shelf is agitated for 10 minutes at 130 RPM (2.167 Hz) and during the first 30 seconds of this 10-minute mix air is sparged in at 2 slpm (approximately 3.33E−05 $m^3$/sec).

21. The method of preferred embodiment 20, wherein said air is filtered and/or dried before being introduced into said container.

22. An apparatus for extending the shelf life of an initiated monomer mixture, the apparatus comprising:
   refrigeration means;
   means for introducing oxygen or oxygen-containing gas into a container of initiated monomer mixture;
   means for evacuating exhaust gas generated by reaction of oxygen with the mixture;
   means for mechanical agitation of the container; and
   an electrical controller for controlling the refrigeration temperature, the agitation and the introduction of oxygen or oxygen-containing gas.

23. The apparatus of preferred embodiment 22, wherein said means for introducing oxygen or oxygen-containing gas is sparging means.

24. The apparatus of preferred embodiment 22, wherein the introducing means comprises an air service unit, an air dryer with pre-filter, and optionally a flow controller, a pressure regulator and valves/distribution manifolds.

25. The apparatus of preferred embodiment 24, wherein said introducing means is sparging means.

26. The apparatus of preferred embodiment 22, wherein the electrical controller is adapted to monitor the length of time the dryer has been in use and to display this information on a user interface screen.

27. The apparatus of preferred embodiment 26, wherein the status of each of the process indicators temperature, agitation duration, agitation rate, oxygen or oxygen-containing gas flow rate and/or pressure can be checked from the user interface screen.

28. The apparatus of preferred embodiment 26, wherein all apparatus functions are operated from the user interface screen.

29. The apparatus of preferred embodiment 26, wherein the user interface screen is capable of allowing operators to change one or more critical parameters for adding oxygen or oxygen-containing gas to the initiated monomer mixtures.

30. The apparatus of preferred embodiment 22, wherein the refrigeration means has at least one shelf and drive motors for shelf agitation are located underneath each shelf.

31. The apparatus of preferred embodiment 22, wherein the refrigeration means has a front access door and a door switch provided on the front access door to detect whether the door is open or closed.

32. The apparatus of preferred embodiment 31, wherein the door is locked while agitation is taking place to prevent accidental opening.

33. An electronic controller for an agitation and oxygenating or aerating refrigeration apparatus comprising:
   means for receiving and displaying process information relating to the rate and duration of introducing oxygen or oxygen-containing gas into a container and the rate and duration of agitation of the container;
   means for displaying and setting the temperature of the apparatus; and
   means for displaying and setting on and off time periods for the apparatus.

34. The electronic controller of preferred embodiment 33, wherein the status of each of the process indicators temperature, agitation duration, agitation rate, oxygen or oxygen-containing gas flow rate and/or pressure can be checked from the user interface screen.

35. The electronic controller of preferred embodiment 33, wherein all apparatus functions are operated from a user interface screen.

36. The electronic controller of preferred embodiment 35, wherein the user interface screen is capable of allowing operators to change one or more critical parameters for adding oxygen or oxygen-containing gas to the initiated monomer mixtures.

37. A system for extending the shelf life of an initiated monomer mixture, the system comprising:
   one or more containers of initiated monomer mixture;
   one or more shelves for the containers;
   refrigeration means;
   an access door;
   means for introducing oxygen or oxygen-containing gas into the container;
   means for evacuating exhaust gas generated by reaction of oxygen with the mixture;
   means for mechanical agitation of the container, the means attached to a shelf; and
   an electrical controller for controlling the temperature of the system, the agitation and the introduction of oxygen or oxygen-containing gas;
   a user interface screen which displays process information relating to the system; and operator control buttons for controlling one or more of: the temperature, the agitation and the introduction of oxygen or oxygen-containing gas.

38. The system of preferred embodiment 37, wherein a cycle is performed every 2.5 hours in which the system agitates a shelf for 10 minutes at 130 RPM (2.167 Hz) and air is sparged in at 2 slpm (approximately 3.33E−05 m$^3$/sec) during the first 30 seconds of this 10 minute mix cycle.

39. The system of preferred embodiment 37, wherein a plurality of containers are spaced over the one or more shelves.

40. The system of preferred embodiment 37, wherein each container is located in its own gripping nest which is mounted on the means for mechanical agitation.

41. The system of preferred embodiment 37, wherein the rate of agitation is variable from the operator user interface screen.

42. The system of preferred embodiment 37, wherein said means for introducing oxygen or oxygen-containing gas is sparging means.

43. The system of preferred embodiment 37, wherein said container is at least 20% larger than the volume of initiated monomer mixture contained therein.

44. The system of preferred embodiment 37, wherein the introducing means comprises an air service unit, an air dryer with pre-filter, and optionally a flow controller, a pressure regulator and valves/distribution manifolds.

45. The system of preferred embodiment 44, wherein said means for introducing oxygen or oxygen-containing gas is sparging means.

46. The system of preferred embodiment 37, wherein the electrical controller is adapted to monitor the length of time the dryer has been in use and to display this information on the user interface screen.

47. The system of preferred embodiment 37, wherein the status of each of the process indicators temperature, agitation duration, agitation rate, oxygen or oxygen-containing gas flow rate and/or pressure can be checked from the user interface screen.

48. The system of preferred embodiment 37, wherein all apparatus functions are operated from the user interface screen.

49. The system of preferred embodiment 37, wherein the user interface screen is capable of allowing operators to change one or more critical parameters for adding oxygen or oxygen-containing gas to the initiated monomer mixtures.

50. The system of preferred embodiment 37, wherein the refrigeration means has at least one shelf and drive motors for shelf agitation are located underneath each shelf.

51. The apparatus of preferred embodiment 37, wherein the refrigeration means has a front access door and a door switch provided on the front access door to detect whether the door is open or closed.

52. The apparatus of preferred embodiment 51, wherein the door is locked while agitation is taking place to prevent accidental opening.

Aspects of the present invention have been described by way of example only and it should be appreciate that additions and/or modifications may be made thereto without departing from the scope thereof as defined in the appended claims.

The invention claimed is:

1. A method of extending the shelf life of an initiated monomer mixture comprising the prevention of premature free radical polymerization during a storage period prior to use of the initiated monomer mixture to form a polymeric article, by introducing oxygen or oxygen-containing gas into a container of the initiated monomer mixture during the storage period and providing mechanical agitation to the container during the storage period, wherein the initiated monomer mixture comprise a mixture of ethylenically unsaturated compounds and radical initiator, and wherein the volume of the container is larger than the volume of initiated monomer mixture contained therein thereby providing space in the container above the initiated monomer mixture.

2. The method as claimed in claim 1, wherein air is introduced into the container as said oxygen or oxygen-containing gas.

3. The method of claim 2, further comprising filtering or drying the air before introducing the air into said container.

4. The method of claim 2, further comprising filtering and drying the air before introducing the air into said container.

5. The method as claimed in claim 1, wherein said method is automated and performed in a closed environment with controlled temperature.

6. The method as claimed in claim 5, wherein the method comprises sparging said oxygen or oxygen-containing gas into the container.

7. The method as claimed in claim 1, wherein said method is carried out at a temperature of about 15° C.

8. The method as claimed in claim 1, wherein said introduction of oxygen or oxygen-containing gas and said mechanical agitation occur simultaneously.

9. The method of claim 1, wherein the shelf life of the initiated monomer mixture is extended to at least four days.

10. The method of claim 9, wherein filtered and dried air is introduced into the container simultaneously with the mechanical agitation, and wherein the method is automated and performed in cycles in a closed environment, wherein conditions of the closed environment are controlled and monitored by an electronic controller, the electronic controller controlling one or more of pressure, temperature, rate of agitation, duration of agitation, frequency of introduction of oxygen or oxygen-containing gas cycles and frequency of agitation cycles.

11. The method of claim 1, which is automated and performed in cycles in a closed environment, wherein conditions of the closed environment are controlled and monitored by an electronic controller.

12. The method of claim 11, wherein the electronic controller controls one or more of pressure, temperature, rate of agitation, duration of agitation, frequency of introduction of oxygen or oxygen-containing gas cycles and frequency of agitation cycles.

13. The method of claim 1, wherein the initiated monomer mixture is a mixture for the preparation of polymeric contact lenses, and the prevention of premature free radical polymerization is during a storage period prior to use of the initiated monomer mixture to form a polymeric contact lens.

14. The method of claim 13, further comprising polymerizing the initiated monomer mixture after the storage period and forming a polymeric contact lens.

* * * * *